(12) United States Patent
Carpenter (10) Patent No.: US 6,304,798 B1
(45) Date of Patent: Oct. 16, 2001

(54) AUTOMATED DATA STORAGE LIBRARY WITH WIRELESS ROBOTIC POSITIONING SYSTEM

(75) Inventor: Kipley Tad Carpenter, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/450,827

(22) Filed: Nov. 29, 1999

(51) Int. Cl.[7] .......................... G05B 15/00; G05B 19/00
(52) U.S. Cl. .......................... 700/258; 700/218; 700/45; 700/260; 700/261; 700/246; 700/245; 700/251; 701/23; 701/30; 702/14; 369/36; 369/178; 318/568.1; 318/568.12; 318/567
(58) Field of Search .................... 700/258, 218, 700/45, 260, 261, 246, 245, 251; 701/23, 50; 702/14; 369/36, 178; 360/92; 901/1, 2, 46, 47, 9, 15, 34, 45; 318/568.1, 568.12, 567; 711/111, 112, 135, 136

(56) References Cited

U.S. PATENT DOCUMENTS

| | | | |
|---|---|---|---|
| 3,715,758 | 2/1973 | Sender | 343/463 |
| 4,119,900 | 10/1978 | Kremnitz | 701/23 |
| 4,974,210 | * 11/1990 | Lee | 700/260 |
| 4,986,384 | 1/1991 | Okamoto et al. | 180/167 |
| 5,216,429 | 6/1993 | Nakagawa et al. | 342/450 |
| 5,345,471 | 9/1994 | McEwan | 375/130 |
| 5,361,070 | 11/1994 | McEwan | 342/21 |
| 5,506,986 | * 4/1996 | Healy | 707/204 |
| 5,546,366 | * 8/1996 | Dang | 369/36 |
| 5,677,927 | 10/1997 | Fullerton et al. | 375/130 |
| 5,908,458 | * 6/1999 | Rowe et al. | 701/50 |
| 5,933,079 | 8/1999 | Frink | 340/539 |
| 6,058,344 | * 5/2000 | Rowe et al. | 701/50 |
| 6,175,466 | * 1/2001 | Hori et al. | 360/92 |

OTHER PUBLICATIONS

Beccari et al., A real–time library for the design of hybrid robot control architectures, 1998, IEEE, pp. 1145–1150.*

Kendall, Cimarron user experience, 1988, IEEE, pp. 93–97.*

Holtz, Autosphy networks yield self–learning robot vision, 1993, IEEE, pp. 53–58.*

* cited by examiner

Primary Examiner—William A. Cuchlinski, Jr.
Assistant Examiner—McDieunel Marc
(74) Attorney, Agent, or Firm—Cartens, Yee & Cahoon (57) ABSTRACT

A method and apparatus in an automated data storage library for identifying a location of a robot in the automated data storage library. Signals are transmitted from a set of transmitters in the automated data storage library, wherein a location of the set of transmitters is known. The signals transmitted from the set of transmitters are received at a receiver located on the robot to form a set of received signals. The location of the robot is determined using the set of received signals and the location of the set of transmitters.

37 Claims, 5 Drawing Sheets

AUTOMATED DATA STORAGE LIBRARY WITH WIRELESS ROBOTIC POSITIONING SYSTEM

BACKGROUND OF THE INVENTION

1. Technical Field

The present invention relates generally to electronic media storage and retrieval and in particular to an improved method and apparatus for locating and tracking robotic units in a storage system.

2. Description of Related Art

Automated data storage library systems provide a means for large quantities of information to be efficiently stored and retrieved by external systems. These systems generally include one or more robotic units that move data storage media to and from read/write devices where the information can be accessed. In order to control these movements, the precise location of the robotic mechanisms within the library relative to the data storage media and the read/write devices must be known. An example of such a system is a tape library. In this case, tape cartridges are stored in specific locations within a structure, and a robotic unit moves about the structure, transferring cartridges to and from tape drives where the information can be accessed by an external host.

Such systems often rely on optical encoders mounted on the robot drive motors to provide the library control unit with position information via an electrical cable. In this case, the robot's position is known relative to a fixed position, typically a mechanical stop that the robot is driven to during an initialization cycle. The position of the robot is then known based on the number of encoder tach counts from the fixed initialization position. Although this method of positioning the robot has been proven to be sufficient and reliable, it does have its issues. If the control system fails or loses control of the robotics for any reason, the position of the robot will become unknown. This means that the robot must be driven to the fixed initialization position and then the entire library must be audited. Also, optical encoders necessary for this type of positioning scheme add cost to the library. Each motor that drives the robot must have an encoder. Several motors can be necessary depending on the complexity of the library and robot geometry. Finally, mechanical tolerances inherent in this system contribute to position errors.

Therefore, it would be advantageous to have an improved method and apparatus for identifying the position of robots in an automated data storage library.

SUMMARY OF THE INVENTION

The present invention provides a method and apparatus in an automated data storage library for identifying a location of a robot in the automated data storage library. Signals are transmitted from a set of transmitters in the automated data storage library, wherein a location of the set of transmitters is known. The signals transmitted from the set of transmitters are received at a receiver located on the robot to form a set of received signals. The location of the robot is determined using the set of received signals and the location of the set of transmitters.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
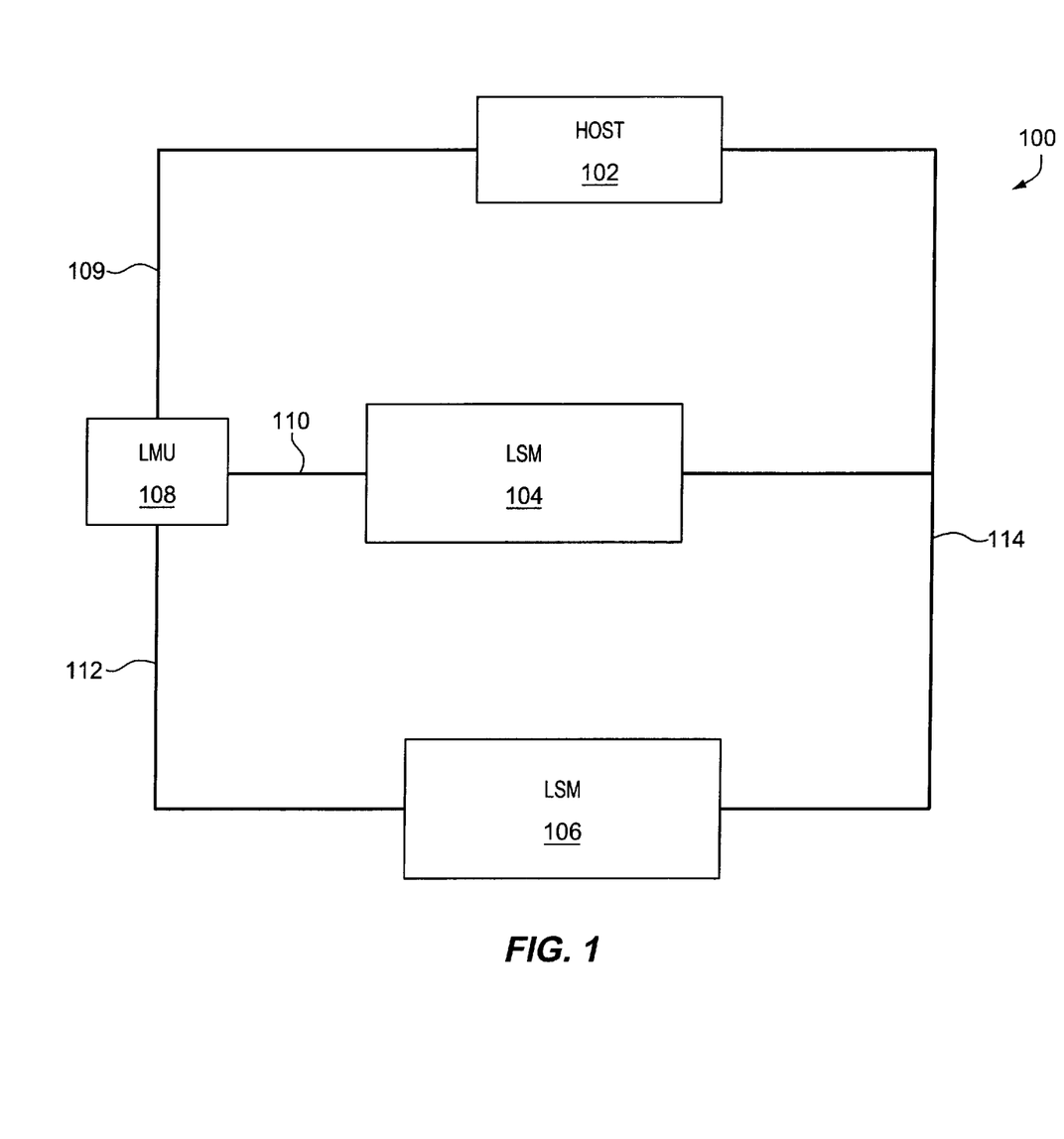
FIG. 1 is an illustration of an automated cartridge system (ACS) in which a preferred embodiment of the present invention may be implemented.

With reference now to the figures, and in particular with reference now to FIG. 1, an automated cartridge system (ACS) is illustrated in which a preferred embodiment of the present invention may be implemented. In this example, ACS 100 includes a host computer 102, a library storage module (LSM) 104, LSM 106 and library module unit (LMU) 108. LMU 108 interprets commands from host computer 102 to relay the appropriate instructions to the appropriate LSM, such as LSM 104 or LSM 106. These instructions are relayed to a library control unit (LCU) (not shown) within LSM 104 or LSM 106. Lines 109, 110, and 112 illustrate control lines to manage LMSs 104 and 106. Thus, 114 illustrates a data path between host 102, LSM 104, and LSM 106.

The illustration of FIG. 1 is not intended to imply architectural limitations to the storage system in which the mechanism of the present invention may be implemented. LMU 108 is used to provide an interface between one or more LSMs and host 102. For example, although the depicted example illustrates two LSMs, other numbers of LSMs may be used with LMU 108, providing the interface between host 102 and the LSMs. LMU 108 acts as a controller and interprets commands from host computer 102. These commands are relayed as appropriate instructions to LSM 104 and LSM 106. Bus 114, on the other hand, provides a read/write data path directly from host 102 to LSM 104 and LSM 106. LSM 104 and LSM 106 provide the appropriate mechanisms for automated cartridge handling. These LSMs provide a storage area for magnetic tape cartridges, but also include an optical system for identifying the correct cartridge, a controlled electromechanical means for selecting the appropriate cartridge and delivering the cartridge to the appropriate tape drive.

Figure 2:
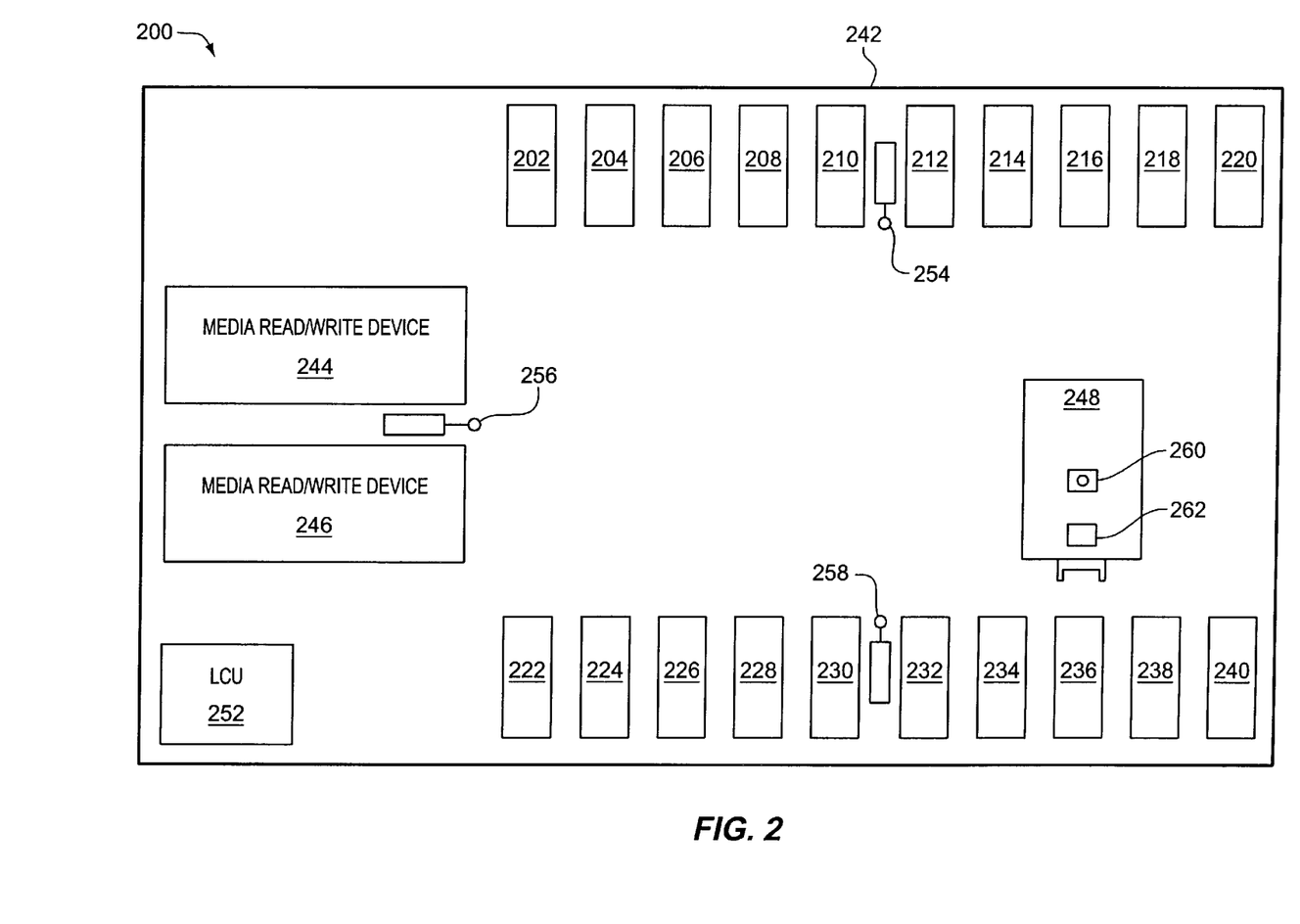
FIG. 2 is a block diagram of a library storage module (LSM) depicted in accordance with a preferred embodiment of the present invention.

With reference now to FIG. 2, a block diagram of a library storage module (LSM) is depicted in accordance with a preferred embodiment of the present invention. In this example, LSM 200 contains data storage media 202–240 within library structure 242. In the depicted example, the data storage media takes the form of tape cartridges. Of course, other types of data storage media may be used, such as diskettes or digital versatile disks. LSM 200 also includes media read/write devices 244 and 246, which are configured to receive the data storage media for reading and writing to the media. Media read/write devices 244 and 246 provide data to a computer, such as host 102 in FIG. 1. The data storage media are manipulated using a robot 248, which includes a manipulating mechanism, such as a hand to grasp the data storage media and places the data storage media into media read/write devices 244 and 246. Further, robot 248 also will return data storage media to the appropriate locations after reading or writing of the media in media read/write devices 244 and 246. Library control unit (LCU) 252 receives instructions from a host computer to identify media that is to be read from or written to. In the depicted example, library control unit 252 receives instructions from a LMU, such as LMU 108 in FIG. 1. Also located within LSM 200 are transmitters 254, 256, and 258. These transmitters, in conjunction with a robot receiver unit 260, are used to identify the position of robots 248 within LSM 200. Robot 248 may take various forms, such as a vehicle having a chassis with four wheels in which the rear wheels are driven by a motor. Steering would be accomplished through an actuator controlled by LCU 252. Communication between robot 248 and LCU 252, in such a configuration, could be accomplished using transmitter receiver 262. Of course, receiver 260 and transmitter receiver unit 262 may be combined into a single unit depending on the implementation. Further, robot 248 may take other forms, such as, for example, a robot transfer system as illustrated in U.S. Pat. No. 5,456,569 in which a robotic transfer system is illustrated having two hands mounted on a separate vertical axis at opposite ends of a balanced rotating horizontal axis.

The present invention provides a method, apparatus, and instructions for use in an automatic data storage library with one or more robots positioned by radio signals. One or more transmitters mounted at known positions within a library structure communicate signals to a receiver mounted on the media transfer robot. Radio signals are the preferred method of communication due to the speed and accuracy with which they can be transmitted, received, and processed. The distance between the transmitters in the automated data storage library, and the receiver or transponder on the robot is calculated by a microprocessor on the robot and transmitted to the library control system. Alternatively, the distance between the transmitters and the receiver or transponder on the robot may be calculated by a computer in the library control unit used to control the robot.

In these examples, a computer within the library control unit applies a mathematical algorithm to determine the position of the robot within the library geometry. Controlled movements of the robot are then executed based on the position data. The number of transmitters necessary will vary depending on the complexity of the library geometry. In general, the number of transmitters required will equal the number of dimensions required to position the robot, however, this depends entirely on the geometry and layout of the library and its components. Transmitters, in addition to what is required, can be used to correct for position errors and to verify accuracy. Further, a fixed position within the library may be used as a calibration position to reduce or eliminate position errors associated with mechanical tolerances.

Figure 3:
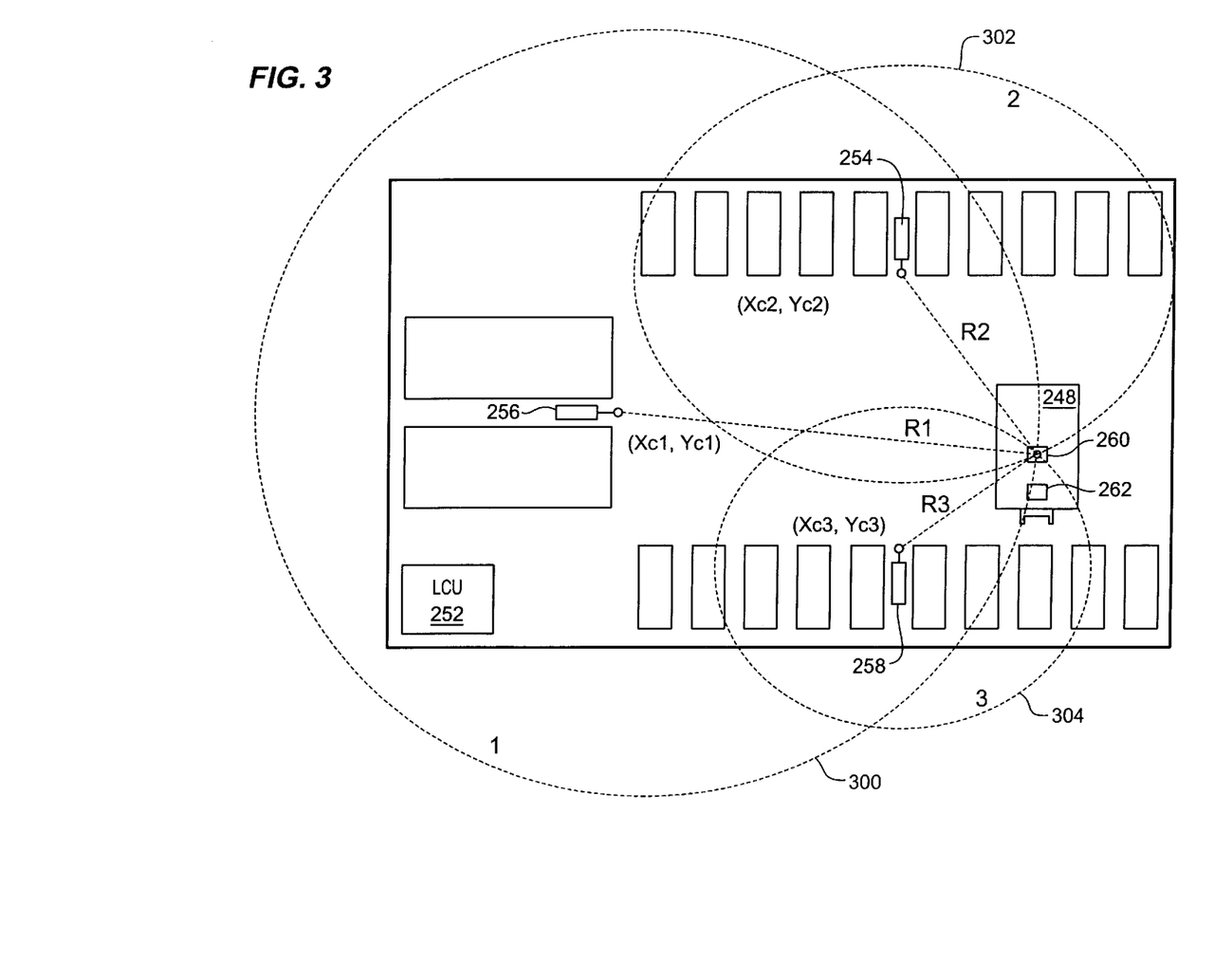
FIG. 3 is a diagram illustrating a positioning mechanism for identifying the position of a robot within a library storage module depicted in accordance with a preferred embodiment of the present invention.

With reference now to FIG. 3, a diagram illustrating a positioning mechanism for identifying the position of a robot within a library storage module is depicted in accordance with the preferred embodiment of the present invention. In this example, transmitter 256 has a known location identified by XY coordinates (Xc1, Yc1). Transmitter 254 has a known location identified by XY coordinates (Xc2, Yc2). Similarly, transmitter 258 also has a know location within LSM 200 identified by XY coordinates (Xc3, Yc3). Transmitters 254, 256, and 258 will transmit radio frequency (RF) signals, which are received by robot receiver 260. Robot receiver 260 in this example is a transponder. This transponder includes a receiver and a transmitter. The transponder sends a signal in response to receiving a transmission from one of the transmitters. Transmitters 254, 256, and 258 will receive the response from the transponder and are able to calculate a distance from the transponder to each individual receiver based on this response. The different signals from the different transmitters may be differentiated based on various parameters, such as, for example, frequency or pulse width.

In this example, robot receiver 260 has a distance of R2 from transmitter 254, a distance of R1 from transmitter 256, and a distance of R3 from transmitter 258. The distance between one of the transmitters and receiver 260 on robot 248 locates the robot on a theoretical circle whose center is the known location of the transmitting device with a radius that is the determined distance between the transmitter and the receiver on the robot. In this example, circles 300, 302, and 304 are illustrated for transmitters 256, 254, and 258 respectively. The intersection of these circles, circles 300, 302, and 304 identifies the position of robot 248. The position of robot 248 in XY coordinates is provided through the solution of the following equations:

$$(X-Xc1)^2+(Y-Yc1)^2=R1^2$$

$$(X-Xc2)^2+(Y-Yc2)^2=R2^2$$

$$(X-Xc3)^2+(Y-Yc3)^2=R3^2$$

Where { Xc1, Yc1, Xc2, Yc2, Xc3, Yc3} are known locations within the library structure. As mentioned, it is possible to create this exact positioning system using only two transmitters. In a library where the robot(s) must be located in three dimensions, the position solution is the intersection of at least three "spheres". In this case, the position of the robot (X,Y,Z) is the solution to the following equations:

$$(X-Xc1)^2+(Y-Yc1)^2(Z-Zc1)^2=R1^2$$

$$(X-Xc2)^2+(Y-Yc2)^2(Z-Zc2)^2=R2^2$$

$$(X-Xc3)^2+(Y-Yc3)^2(Z-Zc3)^2=R3^2$$

Figure 4:
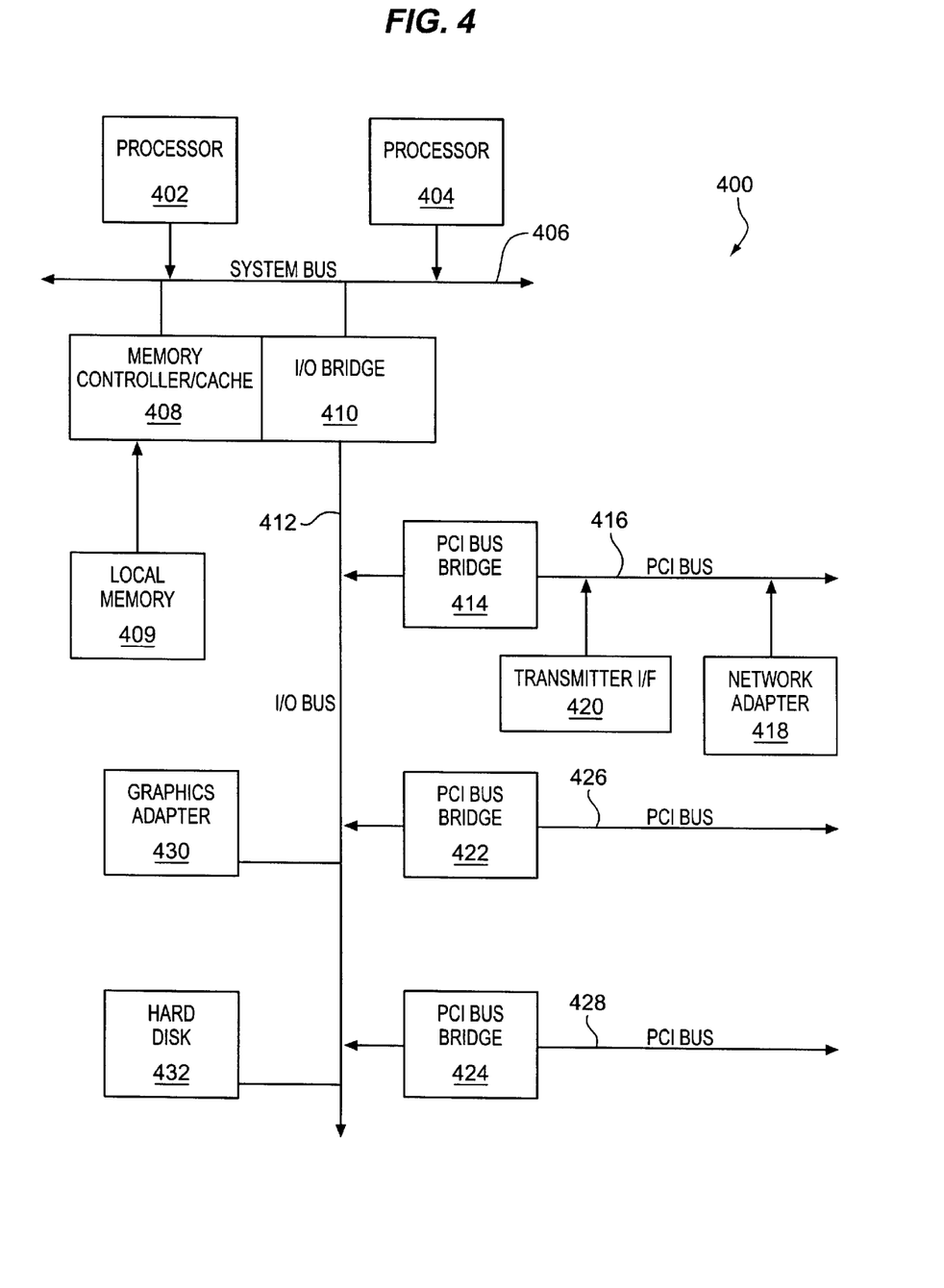
FIG. 4 is a block diagram depicting a data processing system that may be implemented in a library control unit (LCU) depicted in accordance with a preferred embodiment of the present invention.

Referring to FIG. 4, a block diagram depicting a data processing system that may be implemented in a library control unit (LCU) in accordance with a preferred embodiment of the present invention. Data processing system 400 in FIG. 4 may be implemented in LCU 252 in FIG. 2.

Data processing system 400 may be, for example, a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. Typical PCI bus implementations will support four PCI expansion slots or add-in connectors. Communications links to LMU 108 may be provided through network adapter 418. Transmitter interface 420 provides a connection to transmitters, such as transmitters 254, 256, and 258 in FIGS. 2 and 3. Through transmitter interface 420 data processing system 400 receives data from the transmitters. This data may take various forms, for example, distance data or raw transmission/reception times used to calculate distance from the transmitters to the robot receiver.

Additional PCI bus bridges 422 and 424 provide interfaces for additional PCI buses 426 and 428, from which additional interfaces or network adapters may be supported. In this manner, data processing system 400 allows connections to transmitters, such as transmitters 254, 256, and 258. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

Preferably, data processing system 400 will include the coordinates of the transmitters to identify the location of the transmitters within the LMU. In addition, the periphery of the monitored area also may be included. A program or other code is contained within data processing system 400 to identify the position of robot 248 in FIG. 3 within LMU 200 based on data received from transmitters 254, 256, and 258.

Figure 5:
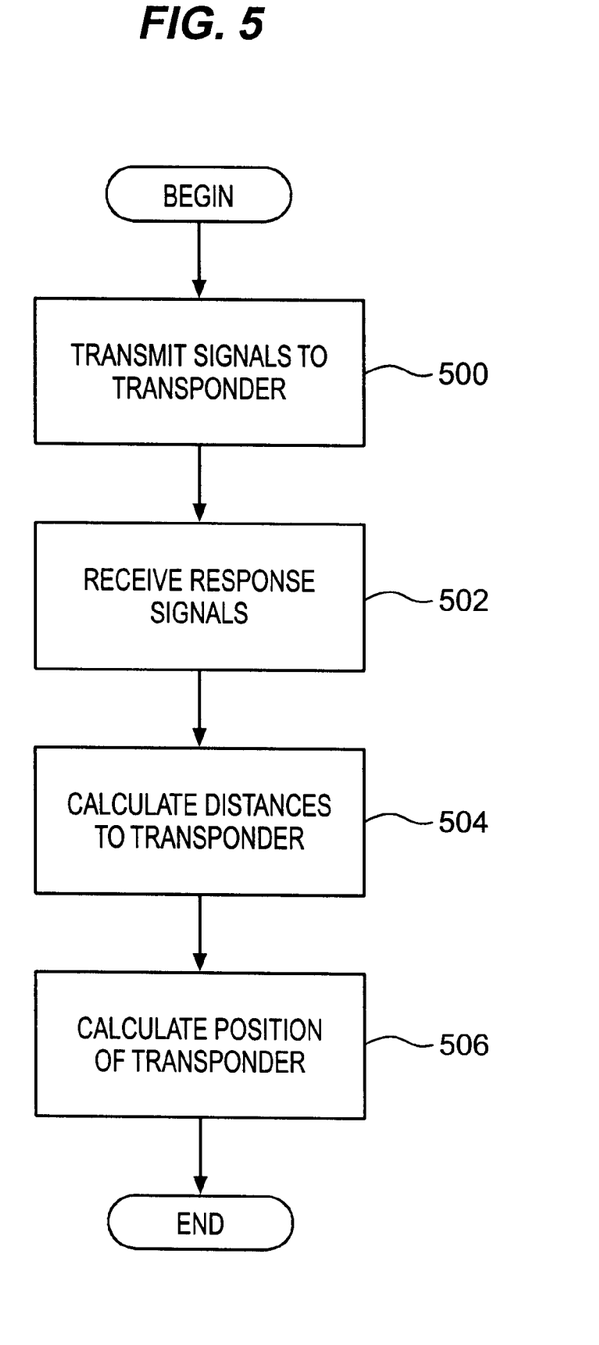
FIG. 5 is a high level flowchart of a process for identifying the position of a robot in a LMU depicted in accordance with a preferred embodiment of the present invention.

With reference now to FIG. 5, a high level flowchart of a process for identifying the position of a robot in a LMU is depicted in accordance with the preferred embodiment of the present invention. The process begins by causing the transmitters to transmit signals to the transponder or receiver located on the robot (step 500). Thereafter, the response signal data from the transmitters are received (step 502). The data received is that used to identify the distance between the transmitters and the transponder. This data includes, for example, timing information as to when the signal was sent to the transponder from the transmitter, as well as timing information as to when a response was received from the transponder. Distances to the transponder from the transmitters are calculated (step 504). The position of the transponder is then calculated (step 506) with the process terminating thereafter. The location of the robot may be identified using the equations and methods described above.

Such a mechanism alleviates the need for current cell and drive targeting systems and provides the control system with the position of the robot immediately when the library is powered into an "on" state. Additionally, if the position calculation and feedback processes can be completed quickly enough, the need for encoders located on robot drive motors may be eliminated.

Thus, the present invention provides an improved method, apparatus, and instructions for use in identifying the location of a robot in a automated data storage library. This advantage is provided through the use of placing transmitters in known locations within the library. A receiver/transmitter device, such as a transponder is placed on the robot. Through the data obtained using these transmitters, the position of the robot may be identified and the movements of the robot may be controlled accordingly. In these examples, the communication between the robot and the LCU take the form of a wireless communications link.

The description of the present invention has been presented for purposes of illustration and description, but is not intended to be exhaustive or limited to the invention in the form disclosed. Many modifications and variations will be apparent to those of ordinary skill in the art. For example, although the depicted examples employ the use of a set of three transmitters and a transponder, located on the robot, other numbers of transmitters may be used depending on the type of positioning information desired. Two transmitters may be used when only a two dimensional positioning of the robot is required. Four transmitters may be used to obtain a more optimal level of information for position calculations.

Further, the mechanism of the present invention may be used to track more than one robot within a library. In addition, the mechanism may be used to track other objects within the library, such as, for example, a tape or disk. Other wireless signals other than RF may be used to implement the positioning mechanism of the present invention. For example, ultrasonic signals may be used in place of the RF signals. Additionally, the transmitters and the receiver may be reversed. For example, a transmitter may be placed on the robot with a set of receivers being placed in the library to receive the transmission from the robot. The distances from the receivers to the transmitters can then be determined with a determination of the location of the robot being based on these distances. The embodiment was chosen and described in order to best explain the principles of the invention the practical application and to enable others of ordinary skill in the art to understand the invention for various embodiments with various modifications as are suited to the particular use contemplated.

What is claimed is:

1. A method in an automated data storage library for identifying a location of a robot in the automated data storage library, the method comprising:

transmitting signals from a set of transmitters in the automated data storage library, wherein a location of the set of transmitters is known;

receiving the signals transmitted from the set of transmitters at a receiver located on the robot to form a set of received signals; and determining the location of the robot using the set of received signals and the location of the set of transmitters.

2. The method of claim 1, wherein the transmitting step comprises:

transmitting the signals from the set of transmitters at known intervals.

3. The method of claim 2, wherein the determining step comprises:

determining intervals at which the signals are received to form a set of received intervals;

identifying a distance between each transmitter within the set of transmitters and the receiver to form a set of distances; and determining the location of the robot using the set of distances and the locations of the set of transmitters.

4. The method of claim 2, wherein the receiver is part of a transponder including a transmitter and wherein the step of determining comprises:

responsive to the signals, returning responses from the transponder to the transmitters;

determining a distance from each of the set of transmitters to the transponder based on the responses to form a set of distances; and determining the location of the robot using the set of distances and the locations of the set of transmitters.

5. The method of claim 1, wherein the determining step is performed by a library control unit located within the automated data storage library.

6. The method of claim 1 further comprising:
controlling movement of the robot using the location of the robot within the automated data storage library.

7. The method of claim 1, wherein the receiver is located on a hand on the robot, wherein the location of the robot in the automated data storage library is the location of the hand in the automated data storage library.

8. The method of claim 1, wherein the automated data storage library is a library storage module.

9. The method of claim 1, wherein the automated data storage library holds tape cartridges.

10. The method of claim 1, wherein the automated data storage library holds magnetic media.

11. The method of claim 1, wherein the automated data storage library holds digital versatile discs.

12. The method of claim 1, wherein the set of transmitters comprises three transmitters.

13. A method in an automated data storage library for identifying a location of a robot in the automated data storage library, the method comprising:
transmitting signals from a transmitter located on the robot,
receiving the signals at a set of receivers to form a set of received signals, wherein a location of the set of receivers is known; and
determining the location of the robot using the set of received signals and the location of the set of receivers.

14. An automated data storage library system comprising:
a storage structure for receiving a plurality of data storage units;
a set of transmitters having known locations, wherein the transmitters transmit signals;
a robot, wherein the robot manipulates data storage units within the automated data storage library;
a receiver located on the robot, wherein the receiver receives the signals to form a set of received signals; and
a control system, wherein the control system determines a distance between the robot and each of the transmitters using the set of received signals to form a set of distances and determines a location of the robot within the automated data storage library using the location of the set of transmitters and the set of distances.

15. The automated data storage library of claim 14, wherein the set of transmitters transmit the signals at known time intervals.

16. The automated data storage library of claim 15, wherein the control system determines the location of the robot within the automated data storage library using the location of the set of transmitters and the set of distances by determining time intervals at which the signals are received to form a set of received intervals, identifying a distance between each transmitter within the set of transmitters and the receiver to form a set of distances using the set of received time intervals and the known time intervals, and determining the location of the robot using the set of distances and the locations of the set of transmitters.

17. The automated data storage library of claim 14, wherein the control system controls the transmission of the signals.

18. The automated data storage library of claim 14, wherein the control system controls the robot using the location of the robot.

19. The automated data storage library of claim 14, wherein the control system is a computer.

20. The automated data storage library of claim 14, wherein the automated data storage library holds tape cartridges.

21. The automated data storage library of claim 14, wherein the automated data storage library holds magnetic media.

22. The automated data storage library of claim 14, wherein the automated data storage library hold digital versatile discs.

23. An automated data storage library system comprising:
a storage structure for receiving a plurality of data storage units;
a robot, wherein the robot manipulates data storage units within the automated data storage library;
a transmitter located on the robot, wherein the transmitter transmits signals;
a set of receivers having known locations, wherein the set of receivers has a known location and received the signals to form a set of received signals; and
a control system, wherein the control system determines a distance between the robot and each of the transmitters using the set of received signals to form a set of distances and determines a location of the robot within the automated data storage library using the location of the set of transmitters and the set of distances.

24. An apparatus in an automated data storage library for identifying a location of a robot in the automated data storage library, the apparatus comprising:
transmitting means for transmitting signals from a set of transmitters in the automated data storage library, wherein a location of the set of transmitters is known;
receiving means for receiving the signals transmitted from the set of transmitters at a receiver located on the robot to form a set of received signals; and
determining means for determining the location of the robot using the set of received signals and the location of the set of transmitters.

25. The apparatus of claim 24, wherein the transmitting means comprises:
transmitting means for transmitting the signals from the set of transmitters at known intervals.

26. The apparatus of claim 25, wherein the determining means comprises:
first determining means for determining intervals at which the signals are received to form a set of received intervals;
identifying means for identifying a distance between each transmitter within the set of transmitters and the receiver to form a set of distances; and
second determining means for determining the location of the robot using the set of distances and the locations of the set of transmitters.

27. The apparatus of claim 25, wherein the receiver is part of a transponder including a transmitter and wherein the determining means comprises:
returning means, responsive to the signals, for returning responses from the transponder to the transmitters;
first determining means for determining a distance from each of the set of transmitters to the transponder based on the responses to form a set of distances; and
second determining means for determining the location of the robot using the set of distances and the locations of the set of transmitters.

28. The apparatus of claim 24, wherein the determining means is performed by a library control unit located within the automated data storage library.

29. The apparatus of claim 24 further comprising:
controlling means for controlling movement of the robot using the location of the robot within the automated data storage library.

30. The apparatus of claim 24, wherein the receiver is located on a hand on the robot, wherein the location of the robot in the automated data storage library is the location of the hand in the automated data storage library.

31. The apparatus of claim 24, wherein the automated data storage library is a library storage module.

32. The apparatus of claim 24, wherein the automated data storage library holds tape cartridges.

33. The apparatus of claim 24, wherein the automated data storage library holds magnetic media.

34. The apparatus of claim 24, wherein the automated data storage library holds digital versatile discs.

35. The apparatus of claim 24, wherein the set of transmitters comprises three transmitters.

36. An apparatus in an automated data storage library for identifying a location of a robot in the automated data storage library, the apparatus comprising:
transmission means for transmitting signals from a transmitter located on the robot,
reception means for receiving the signals at a set of receivers to form a set of received signals, wherein a location of the set of receivers is known; and
determining means for determining the location of the robot using the set of received signals and the location of the set of receivers.

37. A computer program product in a computer readable medium for identifying a location of a robot in an automated data storage library, the computer program product comprising:
first instructions for transmitting signals from a set of transmitters in the automated data storage library, wherein a location of the set of transmitters is known;
second instructions for receiving the signals transmitted from the set of transmitters at a receiver located on the robot to form a set of received signals; and
third instructions for determining the location of the robot using the set of received signals and the location of the set of transmitters.

* * * * *